April 27, 1926.

E. E. RICHARDSON

DRAFT PREVENTING DEVICE

Filed Jan. 12, 1925

INVENTOR
Edward. E. Richardson
BY
Richey Slough + Watts
ATTORNEY

Patented Apr. 27, 1926.

1,582,876

UNITED STATES PATENT OFFICE.

EDWARD E. RICHARDSON, OF MAUMEE, OHIO, ASSIGNOR OF FIFTY-ONE PER CENT TO F. O. RICHEY, OF LAKEWOOD, OHIO.

DRAFT-PREVENTING DEVICE.

Application filed January 12, 1925. Serial No. 1,778.

*To all whom it may concern:*

Be it known that I, EDWARD E. RICHARDSON, a citizen of the United States, residing at Maumee, in the county of Lucas and State of Ohio, have invented certain new and useful Improvements in Draft-Preventing Devices, of which the following is a specification.

My invention relates to draft preventing devices, and particularly to the type thereof which is adapted to bar the passage of dirt, cold air and the like through the slots provided in the floor boards of automotive vehicles, without obstructing the movement of the pedal shank or levers of the vehicle which are passed through and reciprocate in such slots.

One of the objects of my invention is to effectually prevent the disagreeable draft of cold or hot air or exhaust gases or the passage of dirt, dust, etc., through such slots when the automobile is in use and at the same time permit free movement of the shaft.

Another object of my invention is to provide an efficient and durable form of slot closure for the above purpose which can be inexpensively manufactured, which will be efficient in use, and which will operate efficiently for considerable periods of time, during which the controlling pedals of the vehicle upon which the device is installed are often operated.

Other objects of my invention and the nature of the invention itself will become apparent as the description of a specific embodiment thereof progresses and in which description reference will be had to the accompanying drawings forming a part of the specification.

Referring to the drawings—

Figure 6:
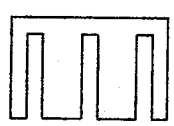
Fig. 6 shows a reduced view of modified form of frame which is integral instead of comprising separate portions.

Referring now to all of the figures of drawing, in all of which like parts are designated by like reference characters, I show a suitable base here illustrated as consisting of a section of the floor board of an automobile shown at 1 and clamping plates 2, 3, 4, and 5 secured thereto. These plates are of any suitable material, but which may preferably be of press-board, or fibre, although they may be of rubber or metal if desired. In the embodiment illustrated and as described, I will henceforth assume that this embodiment is constructed employing these parts made of press-board which is inexpensive and will secure the results sought, to a satisfactory degree. In Fig. 6 the parts are made integral.

Longitudinal slots 6, 7 and 8 are formed in the floor board. Shanks 9, 10 and 11 for automobile mechanism controlling pedals or the like 12, 13 and 14 may be reciprocated longitudinally therein to the desired distance necessary to properly operate the automobile mechanism. Ordinarily, these slots comprise openings in the floor of the forward compartment of the automobile which permit the air from the outside of the car to enter the interior of the car; ordinarily, cold or hot atmospheric air heated by the engine or exhaust gases from the engine freely pass through these elongated floor board openings shown at 6, 7 and 8 to the passenger carrying compartment of the car to the severe discomfort of its occupants.

Figure 1:
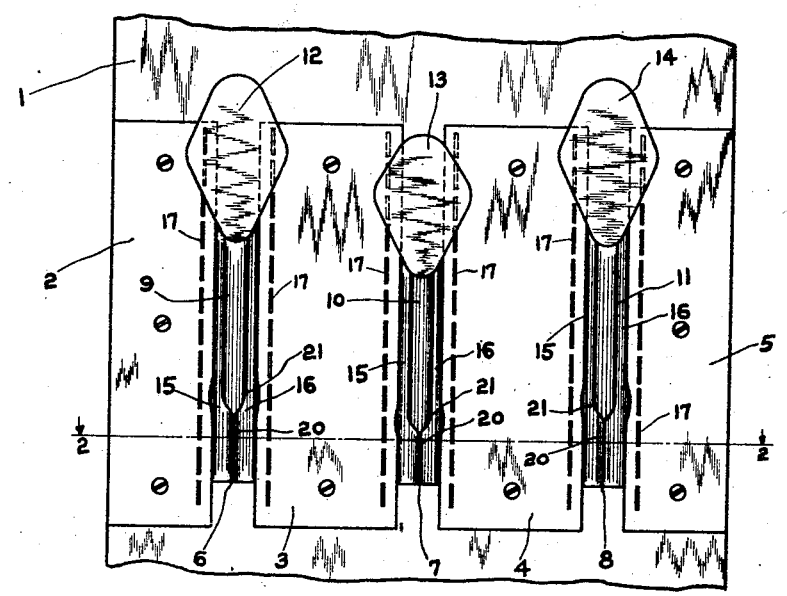
Fig. 1 shows a plan view of an embodiment of my invention disposed on the floor board of an automobile, and closing the slots in which the shanks of automobile controlling pedals such as brake, clutch and gear shifting pedals or the like, are reciprocated.
Figure 2:
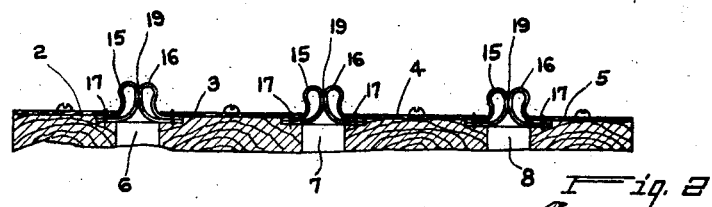
Fig. 2 shows a section of the device of Fig. 1 taken on the line 2—2 of Fig. 1, the view being had in the direction of the indicating arrows.

In the device of my invention, I close such openings otherwise caused by these slots by the provision of strips of rubber illustrated for each of the slots at 15 and 16, each folded in the form of a loop and both ends thereof secured to the base parts 2 and 3, 3 and 4 and 4 and 5, respectively, for the several slots herein shown. These loops of rubber material are secured in any desirable way to the supporting strips such as by sewing the same thereto or such as by inserting wire cleats or brads as shown in the embodiment of my invention illustrated at 17 through the supporting strips and the ends of the rubber loops, thus clamping securely each rubber loop end to the supporting strips. These rubber loops 14 and 16 are made preferably from a flat piece of rubber or from a longitudinal segment of a rubber tube, but in the latter case it is preferably and necessary when best results are to be secured to fold the rubber reversely to the normal direction of curvature formerly had by the action of rubber. This insures that the loops will take their most distended form as illustrated in the figures and as best illustrated in Fig. 2 thereof.

Figures 3, 4, 5:
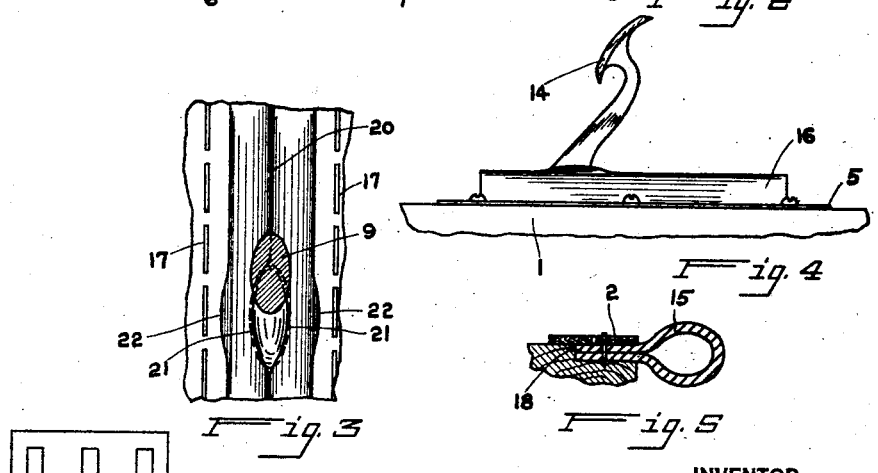
Fig. 3 shows a plan view of a portion of the device of Fig. 1, one of the pedals being shown decapitated, for the purpose of better exposing the underlying parts.
Fig. 4 shows a side elevation of the apparatus illustrated in Fig. 1.
Fig. 5 shows, in section, a view for illustrating the properties of an element of the device.

It will be understood likewise that securing the ends 18 of such rubber loops, as the loop 15, to the upper or lower surface of a rigid or relatively non-flexible strip such as the strip 2 and on its border portion, tends to project the loop 15 generally in the plane of the strip 2; this tendency is illustrated in Fig. 5 wherein the loop 15 is projected although in distended form horizontally from the strip 2, shown in this figure as being in horizontal position. However, in the making up of the device, the loop 15 is prevented from attaining this horizontal position which it naturally would otherwise assume, on account of the engagement of the like but oppositely disposed loop 16 extending from the strip 3, so that each of the loops 15 and 16 are pressed together as shown at 19.

Each of the loops will retain a distended form, but will be prevented from taking the horizontal position of Fig. 5 by the resiliently applied opposing pressure of the opposite loop, the net result being that the seam 20 along the entire length of the slots is maintained closed, the rubber material of which the loops are made, by its inherent resiliency, causing a pressure to be exerted to maintain the seam closed. Each of the rubber loops, being distorted from the normal horizontal position as illustrated in Fig. 5, which it would naturally assume, in trying to regain this normal undistorted position, sets up a pressure opposed to that of the other loop.

Likewise where the shanks 9, 10 and 11 of the automobile controlling pedals extend upward through the floor board slots and between the opposing folds or loops of rubber 15 and 16, they will be engaged resiliently by the adjacent portions of such loops striving to keep the seam 20 closed and, if anything, the pressure is intensified along the points of engagement of the pedal shank and the folded rubber material, the seam about such shanks as illustrated at 21 being maintained closed.

At the sides of the shank the distended rubber loops will be bulged laterally, as illustrated at 22, against the natural tendency for the rubber to move rotatively to a position as illustrated in Fig. 5, thus intensifying the pressure exerted against the pedal shank.

Thus the seam will be closed regardless of the presence of the pedal shank passing between the opposing folds of rubber and even while the shank is being moved longitudinally of the slots and through the slots in the line of the seam 20.

In order to secure most satisfactory results, the folds of rubber are preferably made of soft rubber material; the quality thereof which I find to be very suitable for this purpose is the same as that used for inner tubes of automobile tires; as a matter of fact, sections of rubber cut from such tubes reversely folded have been found to be very suitable for the purpose. However, folds of other resilient material may be used for the purpose, although I personally prefer the rubber material described.

Much of the effort to close the slot results from the effort of the loops to regain the normal substantially cylindrical form of the loops. This pressure is exerted largely in a horizontal direction. I am aware that others have sought to accomplish my purposes by the use of flat or substantially flat flanges, but substantially all the pressure exerted by such devices has been due to the bending of the flanges and is so harsh and concentrated that the surface of the flanges adheres to the pedal shank with deleterious consequences. The flanges must be made stiff so that they will exert sufficient pressure to close the slot. When so made the flanges will not close before and behind the shank.

In my device the opposite loops or flanges engage over a considerable area, as shown in Fig. 2 for almost the entire length of the innermost sides of the flanges. The pressure is thus well distributed and not very great per unit of area. The pressure exerted upon the pedal shaft or the like is also well distributed and not very great per unit area, consequently, there is on danger of the rubber adhering to the shaft with consequent undue wear on the rubber, strain on the flanges and drag on or impediment of the shaft, some or all of which disadvantages have been experienced in previous devices when straight rubber flanges have been employed and defeated their successful use. It will also be appreciated that the shaft tends to flatten or dent in the loops as illustrated in Fig. 4, and to roll it back as illustrated in Fig. 3 rather than merely to bend it back as in the flat flange devices. The flattening still further increases the area of contact and the distribution of pressure between flanges and shank. Thus there is ample pressure to prevent passage of air, etc., between the flanges and little resistance to the movement of the pedal shaft.

In Fig. 6 I show a modified form of rubber loop supporting member which is in one piece and is notched from one side so that it may be passed over the pedals of the automobile. This is sometimes less expensive to manufacture and install than the separate pieces. The rubber loops are to be secured to the border portions of the notches, as described for the borders of the strips.

Having thus described my invention in a specific embodiment, I am aware that numerous and extensive departures may be made from the embodiments illustrated, but without departing from the spirit of my invention.

I claim:—

1. In a draft preventing device for an automotive pedal slot, a pair of oppositely disposed distended loops of rubber secured at their ends each to an opposite border of the slot and each tending to project across the slot to transversely close the same, and each displaced from such position by the projecting looped end of the other resiliently bearing at a side loop portion against a side loop portion of the other, the pedal shank being adapted to pass through and to be reciprocated longitudinally of the slot, both said rubber loops by their inherent resiliency tending to regain their normal undisplaced laterally projecting position being restrained therefrom in part by said interposed pedal shank.

2. In a draft preventing closure for an automotive pedal slot, a pair of oppositely disposed distended loops of rubber secured to opposite borders of the slot, each along one of its sides and each distended by its inherent resiliency and exerting pressure against the other and both exerting pressure against an interposed pedal shank when said shank is reciprocated along the slot.

3. In a draft preventing closure for an automotive pedal slot, a supporting frame about said slot, a pair of oppositely disposed distended loops of rubber secured to opposite borders of the frame nearest the slot, each along one of its sides, and each distended by its inherent resiliency and exerting pressure against the other and both exerting pressure against an interposed pedal shank when said shank is reciprocated along the slot.

4. In a draft closure for an automotive pedal slot through which a controlling pedal shank may be reciprocated, of a pair of resilient tubes secured at their edges at the sides of the slot and bearing against each other at the middle of the slot, such shank adapted to pass between contacting portions of the tubes leaving other portions still pressed in contact, by the resiliency thereof.

5. In a slot closure of the class described, the combinations with a frame having an elongated slot therein for the reception of a pedal shank movable longitudinally of the slot and passing through the slot, of a pair of distended loops of soft rubber or like material each secured at a side edge along a side edge of the slot and having resiliently distended portions projecting across the slot into engagement with the like but oppositely projecting portion of the other loop, said pedal shank adapted to forcibly pass between said engaging loop portions.

6. In a slot closure of the class described, the combination with a frame having an elongated slot therein for the reception of a pedal shank movable longitudinally of the slot and passing through the slot, of a pair of distended loops of soft rubber or like material each secured at a side edge along a side edge of the slot and having resiliently distended portions projecting across the slot into engagement with the like but oppositely projecting portion of the other loop, said pedal shank adapted to forcibly pass between said engaging loop portions, and a single frame supporting both said loops.

7. In a device of the class described, the combination of a base provided with an opening therein through which air and the like and dust and the like is liable to pass, loops of flexible material attached each at one end to the base along the borders of the opening, the free ends of the loops tending normally and when unobstructed to assume a cylindrical or substantially cylindrical shape, the free ends of the loops resting against each other with pressure enough to distort the loops from normal shape and a pedal shaft when moved in said slot between said loops still further distorting the shape of the loops.

8. In a device of the class described, the combination of a base provided with a slot, collapsible flanges normally closing said slot against the passage of air and the like and dirt and the like, and a pedal shaft adapted to temporarily change the form of the sections of the flanges engaged by said shaft when the shaft is moved between the flanges, said sections automatically returning to normal form when said shaft has passed.

9. In a device of the class described, the combination of a support for a plurality of hollow flanges, of flexible material closing a slot for a pedal shaft or the like against the passsage of air, dirt and the like and adapted to be distorted when the shaft passes through the slot and to automatically return to normal closing position when the shaft passes.

10. A means for closing a slot for a pedal shaft or the like against the passage of dirt, air and the like, a plurality of normally interengaging cylindrical shaped flanges of flexible material engaging each other over considerable area and adapted to be distorted when the shaft or the like is moved between them.

11. In a device of the class described, the combination of a base provided with a longitudinal slot through which the shank of an automobile pedal or brake lever may pass, loops of soft sheet rubber attached to the base, one along each side of the slot with the free ends of each loop reared up over the slot and resting with opposing pressure against each other along considerable of the opposing adjacent surfaces to close the slot against the passage of air and the like, dirt, dust, etc., and yielding when the pedal shank or brake lever is passed therethrough.

In testimony whereof I hereunto affix my signature this 30th day of Dec., 1924.

EDWARD E. RICHARDSON.